(12) United States Patent
Kawase et al.

(10) Patent No.: US 11,778,312 B2
(45) Date of Patent: Oct. 3, 2023

(54) IMAGE CAPTURE SYSTEM HAVING WIRELESS COMMUNICATION FUNCTION, IMAGE CAPTURE APPARATUS, AND EXTERNAL CONNECTION APPARATUS

(71) Applicant: CANON KABUSHIKI KAISHA, Tokyo (JP)

(72) Inventors: Satoshi Kawase, Tokyo (JP); Natsumi Sekiguchi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/838,572

(22) Filed: Jun. 13, 2022

(65) Prior Publication Data

US 2022/0311928 A1    Sep. 29, 2022

Related U.S. Application Data

(63) Continuation of application No. 16/834,328, filed on Mar. 30, 2020, now Pat. No. 11,388,327.

(30) Foreign Application Priority Data

Apr. 4, 2019    (JP) .................................. 2019-072094

(51) Int. Cl.
*H04N 23/661*    (2023.01)
*H04N 23/50*    (2023.01)
*H04W 4/30*    (2018.01)

(52) U.S. Cl.
CPC ........... *H04N 23/661* (2023.01); *H04N 23/50* (2023.01); *H04W 4/30* (2018.02)

(58) Field of Classification Search
None
See application file for complete search history.

(56) References Cited

U.S. PATENT DOCUMENTS

| 5,502,366 A | 3/1996 | Lee |
| 6,289,179 B1 | 9/2001 | You |

(Continued)

FOREIGN PATENT DOCUMENTS

| JP | 2005345802 A | * 12/2005 |
| JP | 2005345802 A | 12/2005 |

(Continued)

OTHER PUBLICATIONS

Kita et al.; "Imaging Device, Replacement Unit Used for the Imaging Device, and Replacement Unit Use Control Method and Program"; Dec. 15, 2005; pp. 1-27; English Translation (Year: 2005).*

(Continued)

*Primary Examiner* — Cynthia Segura
(74) *Attorney, Agent, or Firm* — ROSSI, KIMMS & McDOWELL LLP

(57) ABSTRACT

An image capture system that can ensure the rigidity and heat dissipation performance of an external connection apparatus, and also has excellent wireless communication performance. An image capture apparatus includes a first wireless communication section. An external connection apparatus includes a second wireless communication section. The second wireless communication section performs wireless communication with the first wireless communication section. The external connection apparatus is removably attached to the image capture apparatus. The first wireless communication section is disposed toward an attachment surface of the image capture apparatus to which the external connection apparatus is attached, with respect to the photographing optical axis. In a state in which the external connection apparatus is attached to the image capture apparatus, the two wireless communication sections are opposed (Continued)

to each other in a direction orthogonal to a direction of attaching the apparatuses to each other.

2 Claims, 11 Drawing Sheets

(56) References Cited

U.S. PATENT DOCUMENTS

| | | | |
|---|---|---|---|
| 6,806,681 B1 | 10/2004 | Cheiky | |
| 7,736,072 B2 | 6/2010 | Tian | |
| 11,388,327 B2* | 7/2022 | Kawase | H04N 5/23209 |
| 2004/0105024 A1 | 6/2004 | Takahashi | |
| 2008/0095525 A1 | 4/2008 | Maggert | |
| 2008/0181708 A1* | 7/2008 | Yamaguchi | B41J 3/44 |
| | | | 400/613 |
| 2008/0219659 A1* | 9/2008 | Tian | H01M 50/244 |
| | | | 396/539 |
| 2008/0305390 A1* | 12/2008 | Naito | H01M 10/482 |
| | | | 429/159 |
| 2008/0310904 A1* | 12/2008 | Yamaguchi | B41J 15/044 |
| | | | 400/615.2 |
| 2009/0086058 A1 | 4/2009 | Kaplan | |
| 2010/0247089 A1* | 9/2010 | Tian | H01M 50/213 |
| | | | 396/422 |
| 2014/0132802 A1 | 5/2014 | Ohtsuka | |
| 2015/0215508 A1* | 7/2015 | Hirai | H04N 23/56 |
| | | | 348/375 |
| 2016/0112219 A1* | 4/2016 | Lee | H04W 4/80 |
| | | | 455/77 |
| 2018/0019616 A1* | 1/2018 | Yasunori | B60R 16/03 |
| 2019/0379139 A1* | 12/2019 | Takizawa | H01Q 1/526 |
| 2019/0387848 A1* | 12/2019 | Leybourn | H04B 5/0031 |
| 2020/0073213 A1 | 3/2020 | Yano | |
| 2020/0137253 A1 | 4/2020 | Kawataki | |
| 2020/0329204 A1 | 10/2020 | Ohtsuka | |

FOREIGN PATENT DOCUMENTS

| | | |
|---|---|---|
| JP | 2015203825 A | 11/2015 |
| JP | 2018054643 A | 4/2018 |

OTHER PUBLICATIONS

Office Action issued in U.S. Appl. No. 16/834,328 dated Dec. 20, 2021.

Notice of Allowance issued in U.S. Appl. No. 16/834,328 dated Mar. 30, 2022.

* cited by examiner

IMAGE CAPTURE SYSTEM HAVING WIRELESS COMMUNICATION FUNCTION, IMAGE CAPTURE APPARATUS, AND EXTERNAL CONNECTION APPARATUS

BACKGROUND OF THE INVENTION

Field of the Invention

The present invention relates to an image capture system, an image capture apparatus, and an external connection apparatus, and more particularly to an image capture system that performs wireless communication between an image capture apparatus and an external connection apparatus.

Description of the Related Art

There has been known an external power supply unit that includes an operation member, a storage device, and a power source, and is electrically connected to an image capture apparatus, for performing transmission of command signals from the operation member to the image capture apparatus, transmission and reception of image data and the like between a storage device and the image capture apparatus, power supply to the image capture apparatus, and so forth (see Japanese Laid-Open Patent Publication (Kokai) No. 2015-203825). For example, as an image capture system comprised of an image capture apparatus and an external power supply unit that is removably attached to a bottom of the image capture apparatus, there is known one which has a pair of data communication means disposed on respective opposite sides of an attachment surface via which the external power supply is removably attached to the image capture apparatus. As the data communication between the image capture apparatus and the external power supply unit, short-distance wireless communication, such as NFC (Near Field Communication), is performed, for example.

In the image capture system according to the above-described conventional technique, a metal plate for increasing the rigidity of the external power supply unit and dissipating heat transmitted from the image capture apparatus is arranged directly under a cover toward an attachment surface via which the external power supply unit is attached to the image capture apparatus. On the other hand, to ensure the performance of short-distance wireless communication, it is required that no conductive member is disposed between a pair of units for short-distance wireless communication, which are provided in the image capture apparatus and the external power supply unit, respectively. Therefore, in the above-described conventional technique, it is required to form an opening in the metal plate, and as a result, there is a fear that the rigidity and heat dissipation performance of the external power supply unit are degraded.

SUMMARY OF THE INVENTION

The present invention provides an image capture system that can ensure the rigidity and heat dissipation performance of an external connection apparatus and also has excellent wireless communication performance.

In a first aspect of the present invention, there is provided an image capture system comprising an image capture apparatus that includes a first wireless communication unit, and an external connection apparatus that includes a second wireless communication unit which performs wireless communication with the first wireless communication unit, the external connection apparatus being removably attached to the image capture apparatus, wherein the first wireless communication unit is disposed at a location of the image capture apparatus toward an attachment surface of the image capture apparatus to which the external connection apparatus is attached, with respect to a photographing optical axis of the image capture apparatus, and wherein in a state in which the external connection apparatus is attached to the image capture apparatus, the first wireless communication unit and the second wireless communication unit are opposed to each other in a direction orthogonal to a direction of attaching the external connection apparatus to the image capture apparatus.

In a second aspect of the present invention, there is provided an image capture apparatus to which an external connection apparatus is removably attached, comprising an image sensor, a battery chamber that includes a wall that is formed of resin and is parallel to an image plane of the image sensor, and a wireless communication unit that is disposed at a location of the image capture apparatus toward an attachment surface of the image capture apparatus to which the external connection apparatus is attached, with respect to a photographing optical axis, such that the wireless communication unit is opposed to the wall of the battery chamber.

In a third aspect of the present invention, there is provided an image capture apparatus to which an external connection apparatus is removably attached, comprising a rear cover that is formed of resin and is disposed at a rear of the image capture apparatus, a rubber member that covers an opening formed in the rear cover from an outside of the rear cover, and a wireless communication unit that is disposed at a location of the image capture apparatus toward an attachment surface of the image capture apparatus to which the external connection apparatus is attached, with respect to a photographing optical axis inside the image capture apparatus, such that the wireless communication unit is opposed to the opening.

In a fourth aspect of the present invention, there is provided an external connection apparatus that is removably attached to an image capture apparatus, comprising an insertion section that includes a wireless communication unit disposed therein and is inserted into a battery chamber of the image capture apparatus, wherein the insertion section includes a wall that is formed of resin and is parallel to a direction of attaching the external connection apparatus to the image capture apparatus, and wherein the wireless communication unit is opposed to the wall.

In a fifth aspect of the present invention, there is provided an external connection apparatus that is removably attached to an image capture apparatus, comprising a top cover that is brought into contact with a bottom cover of the image capture apparatus in a state in which the external connection apparatus is attached to the image capture apparatus, a protrusion that is formed of resin and protrudes in a direction of attaching the external connection apparatus to the image capture apparatus with respect to the top cover, and a wireless communication unit contained in the protrusion.

According to the present invention, it is possible to provide an image capture system that can ensure the rigidity and heat dissipation performance of an external connection apparatus, and also has excellent wireless communication performance.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

First, a description will be given of an image capture system according to a first embodiment of the present invention.

Figure 1A:
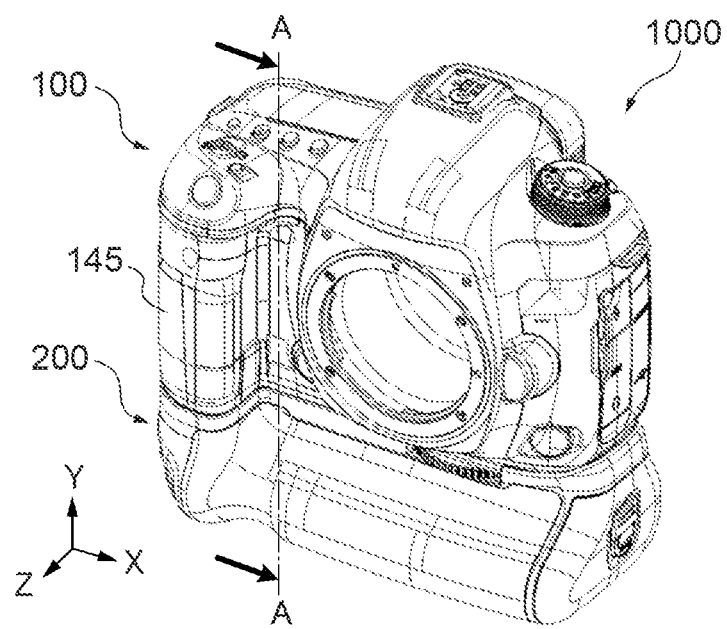
FIGS. 1A to 1C are perspective views respectively showing the appearances of an image capture system according to a first embodiment, and an image capture apparatus and an external connection apparatus, which are components of the image capture system.
Figure 1B:
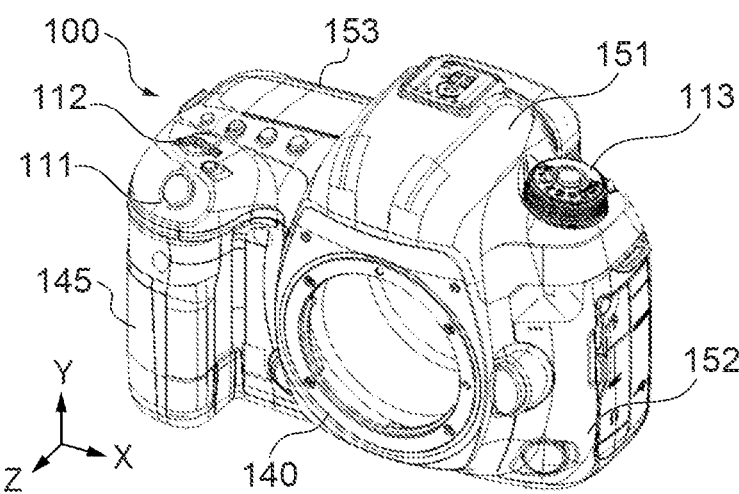
Figure 1C:
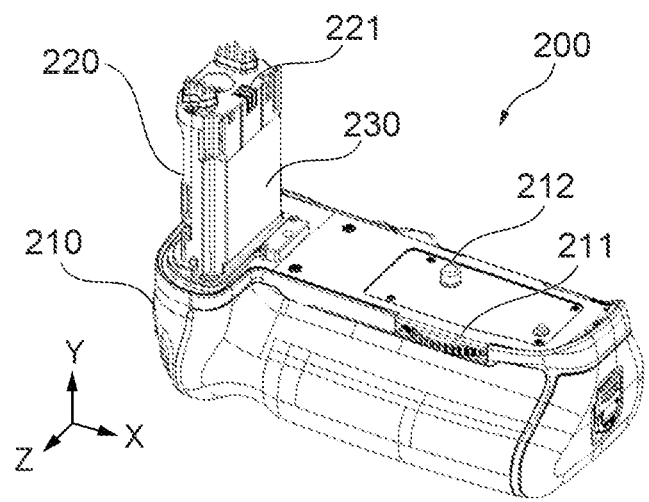

FIG. 1A is a perspective view of the appearance of the image capture system 1000 according to the first embodiment. The image capture system 1000 includes an image capture apparatus 100 and an external connection apparatus 200 removably attached to the image capture apparatus 100. The image capture apparatus 100 is a camera body of a so-called digital single-lens reflex camera. The external connection apparatus 200 is a camera accessory capable of supplying electrical power to the image capture apparatus 100, instructing the image capture apparatus 100 to perform an image capturing operation, and transmitting and receiving image data to and from the image capture apparatus 100 by short-distance wireless communication. FIG. 1B is a perspective view of the appearance of the image capture apparatus 100. FIG. 1C is a perspective view of the appearance of the external connection apparatus 200.

For the convenience of explanation, an X direction, a Y direction, and a Z direction, which are orthogonal to each other, are defined as indicated in FIGS. 1A to 1C, and directions indicated by arrows and opposite directions thereto are referred to as positive (+) directions and negative (−) directions, respectively. The Z direction is a direction orthogonal to the image plane of an image sensor 103 (see FIGS. 2 and 3B) equipped in the image capture apparatus 100. When the X direction and the Z direction are parallel to a horizontal plane, the Y direction is orthogonal to the horizontal plane (i.e. parallel to a vertical direction). The position of the image capture system 1000 taken when the X direction and the Z direction are substantially parallel to a horizontal direction is referred to as a normal position. When the image capture system 1000 is in the normal position, the external connection apparatus 200 is positioned below the image capture apparatus 100 in appearance.

The image capture apparatus 100 is covered with a top cover 151, a front cover 152, and a rear cover 153, which are exterior members. The top cover 151 has a release button 111, an electronic dial 112, and a mode dial 113 arranged thereon. The release button 111 is an operation member for giving a shooting instruction to the image capture apparatus 100. When the release button 111 is pressed, an image capturing operation is performed by the image capture apparatus 100. The electronic dial 112 is an operation member for setting image capturing conditions and the like for the image capture apparatus 100. By operating the electronic dial 112, it is possible to set desired shooting parameters including an exposure setting. The mode dial 113 is an operation member for enabling a change in a shooting mode.

On the left side of the image capture apparatus 100 as viewed from the front, there is provided a grip section 145 for a photographer to hold the image capture apparatus 100 during image capturing. A mount 140 for enabling a lens barrel (interchangeable lens), not shown, to be removably mounted on the image capture apparatus 100 is provided on a substantially central portion of the image capture apparatus 100 on the front side thereof.

The external connection apparatus 200 includes a body 210 that extends in the X direction as a longitudinal direction, and an insertion section 220 that protrudes in the positive Y direction from one end and its vicinity of the body 210 in the X direction. The external connection apparatus 200 is attached to the image capture apparatus 100 by rotating a rotary member 211 to rotate a tripod screw 212, thereby screwing the tripod screw 212 into a tripod screw hole, not shown, formed in the image capture apparatus 100. At this time, the insertion section 220 is accommodated in an accommodation section (not shown) provided in the grip section 145 of the image capture apparatus 100. Note that, the accommodation section of the image capture apparatus 100 is specifically a battery chamber 170 (see FIG. 3A).

The external connection apparatus 200 is capable of accommodating one or a plurality of batteries, not shown, therein, whereby it is possible to supply electrical power to the image capture apparatus 100 via a second connection terminal 221 (see FIGS. 1C and 2) provided in the vicinity of a tip end of the insertion section 220. The insertion section 220 includes a communication section 230. The communication section 230 has a second short-distance wireless communication section 231, described hereinafter with reference to FIG. 2, arranged therein.

Figure 2:
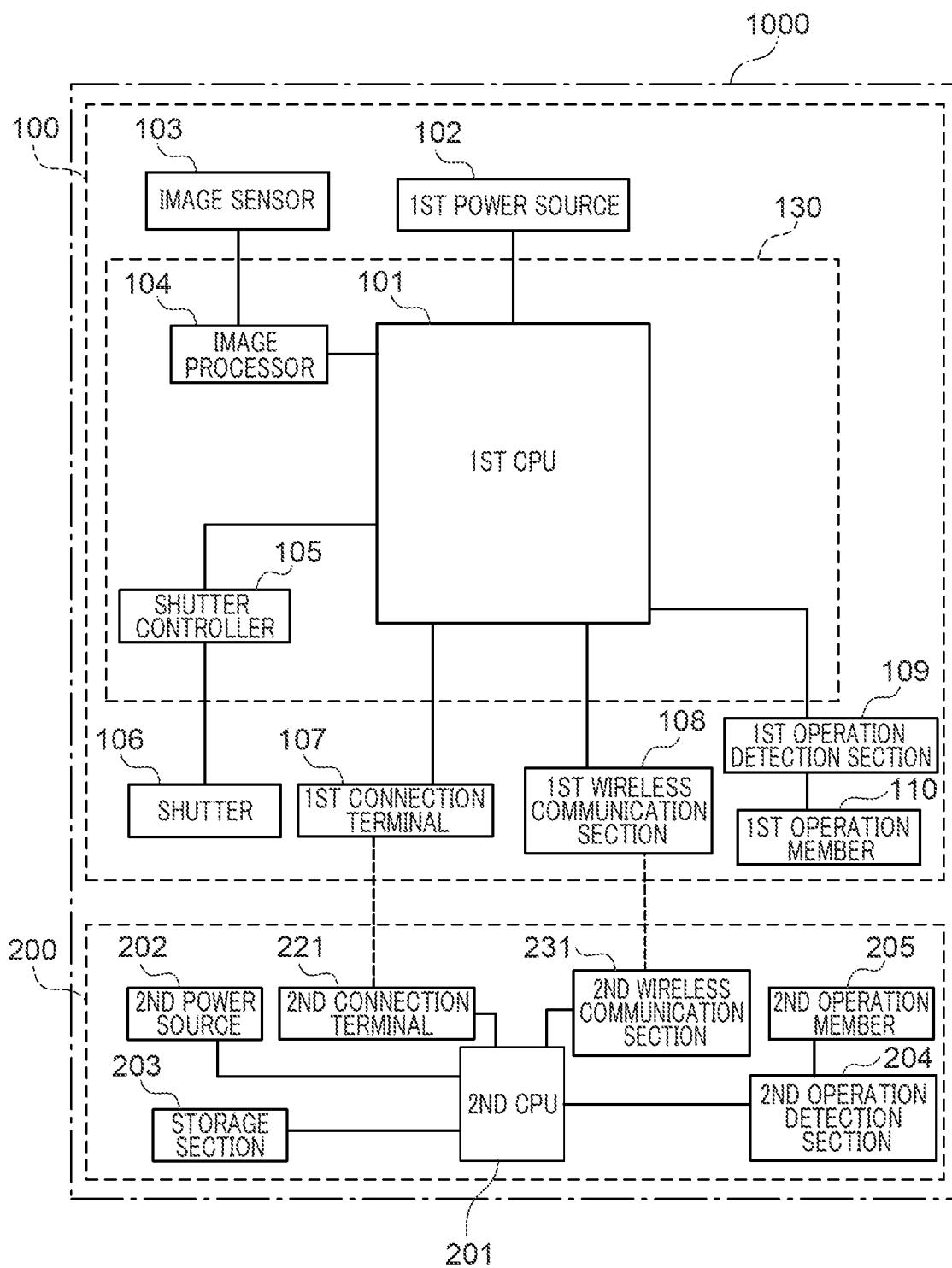
FIG. 2 is a functional block diagram of the image capture system according to the first embodiment.

FIG. 2 is a functional block diagram of the image capture system 1000. Note that out of components appearing in FIG. 2, those appearing in FIGS. 1A to 1C are denoted by the same reference numerals. The image capture apparatus 100 is comprised of a first CPU 101, a first power source 102, the image sensor 103, an image processor 104, a shutter controller 105, a shutter 106, a first connection terminal 107, a first short-distance wireless communication section 108, a first operation detection section 109, and a first operation member 110. The external connection apparatus 200 is comprised of a second CPU 201, a second power source 202, a storage section 203, a second operation detection section 204, a second operation member 205, the second connection terminal 221, and the second short-distance wireless communication section 231. In the following description, the first short-distance wireless communication section 108 is referred to as the "first wireless communication section 108" and the second short-distance wireless communication section 231 is referred to as the "second wireless communication section 231".

The first CPU 101 is a central processing unit that controls the overall operation of the image capture apparatus 100 by executing a computer program read from a memory to thereby perform centralized control of the components of the image capture apparatus 100. Many of various electric circuits (a detection circuit, a control circuit, a processing circuit, etc.) of the first CPU 101, the image processor 104, the shutter controller 105, and so forth are mounted on a main circuit board 130 (first circuit board). The main circuit board 130 is a printed-wiring board, for example.

The first power source 102 supplies electrical power to the components of the image capture apparatus 100. Note that in a state in which the external connection apparatus 200 is attached to the image capture apparatus 100, the battery chamber 170 (see FIG. 3A) of the image capture apparatus 100 cannot be used, but instead of this, electrical power can be supplied from the second power source 202 of the external connection apparatus 200 to the image capture apparatus 100.

The image sensor 103 is specifically a CCD sensor, a CMOS sensor, or the like. The image processor 104 converts electrical signals (image signals) delivered from the image sensor 103 to image data and output the image data to the first CPU 101. The shutter 106 is disposed on the front side of the image sensor 103 and adjusts the exposure time of the image sensor 103. The shutter controller 105 drives the shutter 106 based on a command from the CPU 101.

The first operation member 110 includes the release button 111, the electronic dial 112, the mode dial 113, shown in FIG. 11, and so forth. The first operation detection section 109 detects an operation of the first operation member 110 caused by a user' operation performed on the first operation member 110 and transmits a signal associated with the detected operation to the first CPU 101.

The first wireless communication section 108 of the image capture apparatus 100 and the second wireless communication section 231 of the external connection apparatus 200 transmit and receive image data, control signals, and the like, to and from each other by wireless communication. In the external connection apparatus 200, the second CPU 201 performs centralized control of the components of the external connection apparatus 200, to thereby control the overall operation of the external connection apparatus 200. Further, the second CPU 201 makes up for part of control associated with an image capturing operation of the image capture apparatus 100.

The second operation member 205 includes e.g. a release button and an electronic dial, neither of which is shown. The second operation detection section 204 detects an operation of the second operation member 205 and delivers a signal indicative of the detected operation to the second CPU 201. The second power source 202 supplies electrical power to the image capture apparatus 100 in a state in which the second connection terminal 221 of the external connection apparatus 200 is connected to the first connection terminal 107 of the image capture apparatus 100. The storage section 203 is storage means, such as a semiconductor memory, which stores image data acquired from the image capture apparatus 100 via the second wireless communication section 231.

Figure 3A:
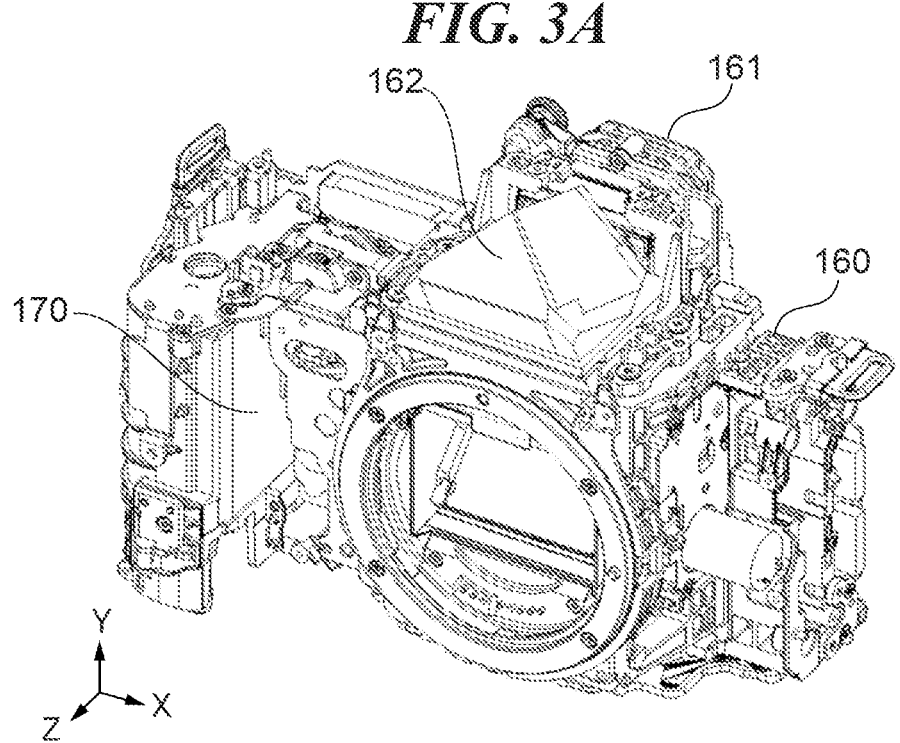
FIGS. 3A and 3B are a perspective view and an exploded perspective view of a skeleton of the image capture apparatus used in the first embodiment.
Figure 3B:
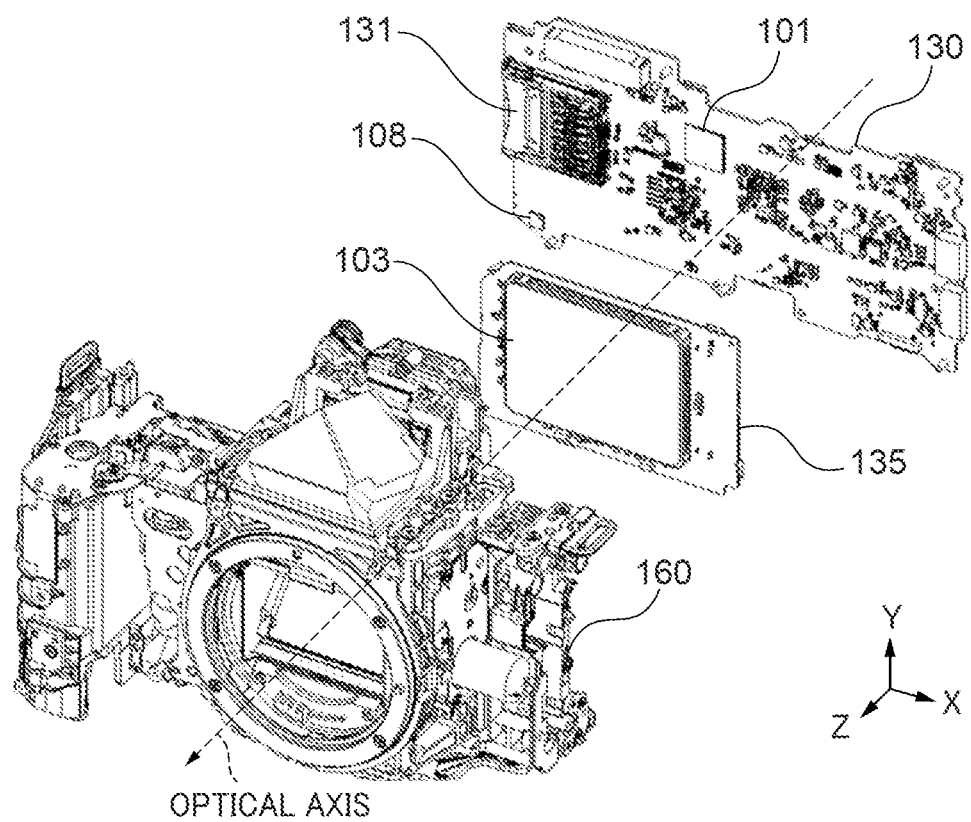

FIG. 3A is a perspective view of (skeleton) the image capture apparatus 100 in a state in which the top cover 151, the front cover 152, and the rear cover 153 are removed from the image capture apparatus 100. FIG. 3B is an exploded perspective view of a main base 160, an image capturing circuit board 135 having the image sensor 103 mounted thereon, and the main circuit board 130, which are separated from the FIG. 3A state in a direction of a photographing optical axis. Note that the photographing optical axis appearing in FIG. 3B is orthogonal to the image plane of the image sensor 103.

The main base 160 is a member forming the skeleton of the image capture apparatus 100 and is formed e.g. of resin. The main circuit board 130 is fixed to the main base 160 with a plurality of screws (not shown). The main base 160 includes the battery chamber 170 for accommodating a battery, not shown. Note that when the external connection apparatus 200 is attached to the image capture apparatus 100, the insertion section 220 of the external connection apparatus 200 is accommodated in the battery chamber 170. A finder 161 and a pentaprism 162 are arranged above the main base 160, so that it is possible for the photographer to view an object image projected through the pentaprism 162 through the finder 161.

The image sensor 103 is mounted on the image capturing circuit board 135. The image capturing circuit board 135 is fixed to the main base 160 with a plurality of screws (not shown) such that the image plane of the image sensor 103 is orthogonal to the Z direction (i.e. parallel to an XY plane). On the main circuit board 130, there is mounted an external storage medium connector 131 (holding unit) for holding a storage medium (not shown), such as an SD card, which stores image data of a captured image. The CPU 101 writes and reads image data to and from a memory card directly or via the image processor 104.

The main circuit board 130 has the first wireless communication section 108 mounted thereon. The first wireless communication section 108 is a semiconductor device (IC) that contains an antenna for wireless communication. The first wireless communication section 108 is disposed on the front surface (surface toward the main base 160, surface of the main circuit board 130 toward the front side of the image capture apparatus 100 (in the positive Z direction)) of the main circuit board 130. By arranging the external storage medium connector 131, the first wireless communication section 108, and the CPU 101 for controlling the two 131 and 108, on the main circuit board 130 which is single, it is possible to make electric wiring for connecting them as short as possible.

Figure 4A:
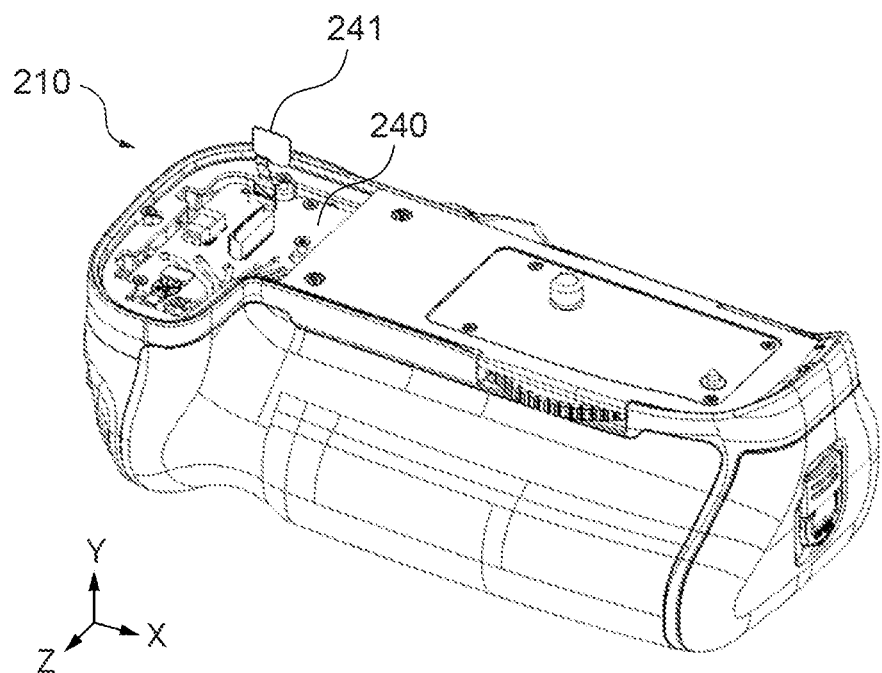
FIGS. 4A and 4B are perspective views of a body of the external connection apparatus according to the first embodiment.
Figure 4B:
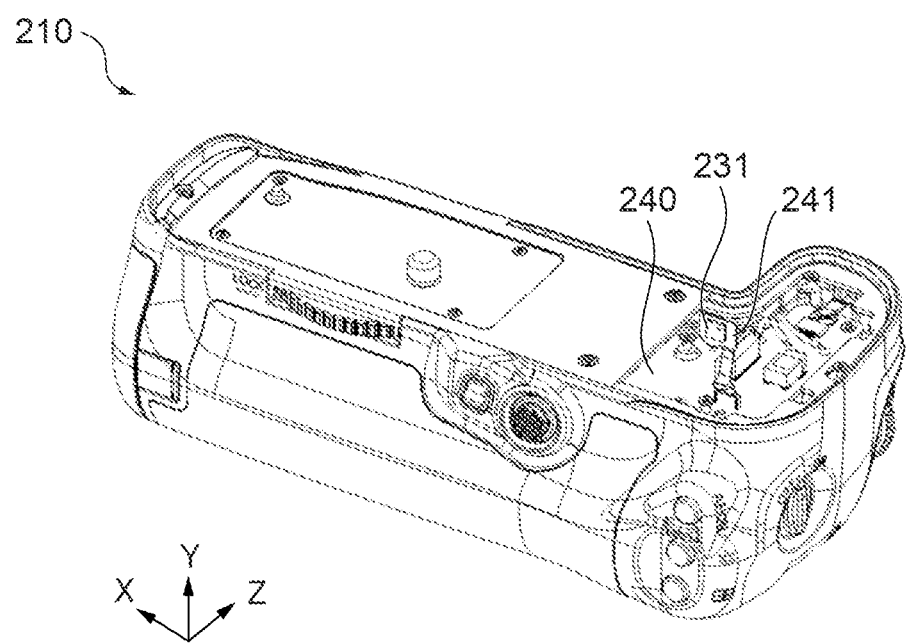

FIG. 4A is a first perspective view of the body 210 of the external connection apparatus 200. FIG. 4B is a second perspective view of the body 210 of the external connection apparatus 200. FIG. 4A and FIG. 4B are different only in the direction of viewing the body 210. The body 210 has a control board 240 arranged thereon. On the control board 240, there are mounted various circuits of the second CPU 201 etc. A flexible printed circuit board (hereinafter referred to as the "FPC") 241 having the second wireless communication section 231 mounted thereon is electrically connected to the control board 240 by a connector, not shown. Similar to the first wireless communication section 108, the second wireless communication section 231 is an IC that contains an antenna for wireless communication and performs wireless communication with the first wireless communication section 108. A wireless communication operation of the second wireless communication section 231 is controlled by the second CPU 201. The second wireless communication section 231 is disposed on a surface of the FPC 241 toward the rear side of the image capture apparatus 100 (in the negative Z direction) in the state in which the external connection apparatus 200 is attached to the image capture apparatus 100.

Figure 5:
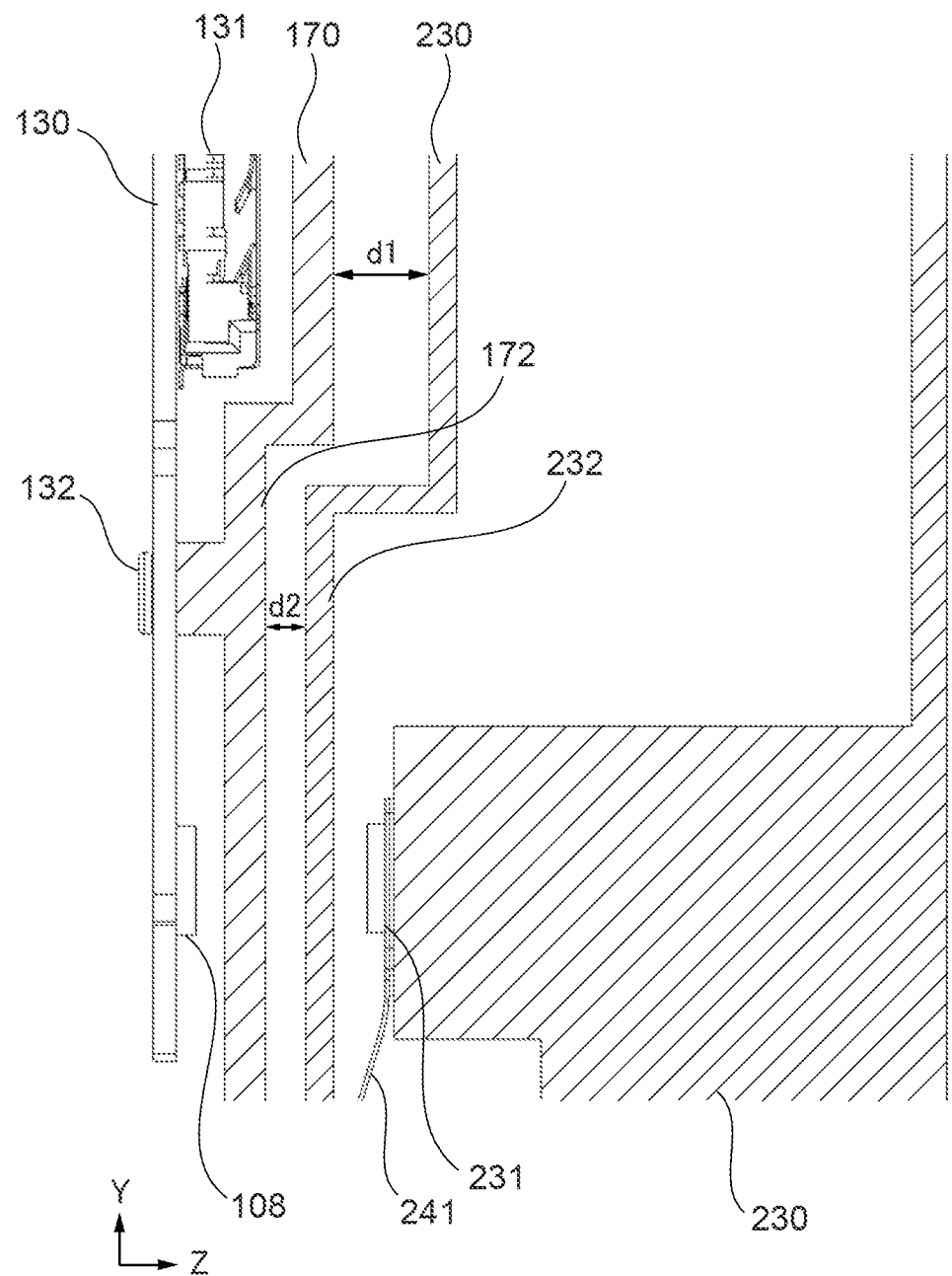
FIG. 5 is a partial cross-sectional view taken along A-A in FIG. 1A.

FIG. 5 is a partial cross-sectional view taken along A-A in FIG. 1A. The first wireless communication section 108 mounted on the main circuit board 130 of the image capture apparatus 100 and the second wireless communication section 231 mounted on the FPC 241 arranged in the communication section 230 (insertion section 220) of the external connection apparatus 200 are opposed to each other in the Z direction. In other words, the first wireless communication section 108 and the second wireless communication section 231 are opposed to each other in a direction orthogonal to a direction in which the external connection apparatus 200 is attached to the image capture apparatus 100.

In order that the first wireless communication section 108 and the second wireless communication section 231 perform wireless communication, it is necessary to hold the first wireless communication section 108 and the second wireless communication section 231 at a predetermined distance or less from each other. In the image capture system 1000, when attaching the external connection apparatus 200 to the image capture apparatus 100, the insertion section 220 including the communication section 230 is caused to be received into the battery chamber 170 in the positive Y direction which is a direction of attaching the external connection apparatus 200 to the image capture apparatus 100, with a distance d1 maintained between a wall of the communication section 230 and a wall of the battery chamber 170.

Here, the wall that defines the battery chamber 170 and is opposed to the first wireless communication section 108 in the Z direction has a recessed portion 172, and the first wireless communication section 108 is opposed to an opposite surface to (outer side of) a recessed surface of the recessed portion 172. On the other hand, the wall of the communication section 230 (insertion section 220) of the external connection apparatus 200, which is opposed to the second wireless communication section 231, has a protruding portion 232, and the second wireless communication section 231 is opposed to an opposite surface to (inner side of) a protruding surface of the protruding portion 232.

When the attachment of the external connection apparatus 200 to the image capture apparatus 100 is completed, the protruding portion 232 and the recessed portion 172 are opposed to each other in the Z direction. The protruding portion 232 and the recessed portion 172 are configured such that when they are opposed to each other, a distance d2 between the recessed surface of the recessed portion 172 and the protruding surface of the protruding portion 232 is shorter than the distance d1. Thus, it is possible to arrange the first wireless communication section 108 and the second wireless communication section 231 at a distance which makes it possible to obtain excellent wireless communication performance.

Note that the wall that defines the battery chamber 170 and exists between the first wireless communication section 108 and the second wireless communication section 231 and the wall that forms the communication section 230 (insertion section 220) are both formed of resin. Therefore, these walls do not hinder wireless communication between the first wireless communication section 108 and the second wireless communication section 231.

Further, by providing the recessed portion 172 and the protruding portion 232 such that they are positioned at a location toward the negative Y direction of the external storage medium connector 131 (below the external storage medium connector 131 when the image capture system 1000 is in the normal position), a space-saved construction is realized without increasing the thickness of the image capture apparatus 100 in the Z direction. Further, the main circuit board 130 is fixed to the battery chamber 170 with a screw 132 provided at a location between the first wireless communication section 108 and the external storage medium connector 131 in the Y direction. Thus, the main circuit board 130 is positively fixed to the battery chamber 170 in the vicinity of the first wireless communication section 108, whereby it is possible to prevent the main circuit board 130 from warping or floating in the vicinity of the first wireless communication section 108. As a consequence, the first wireless communication section 108 and the second wireless communication section 231 are made difficult to deviate from a proper positional relationship therebetween, whereby it is possible to maintain the excellent wireless communication performance.

Figure 6A:
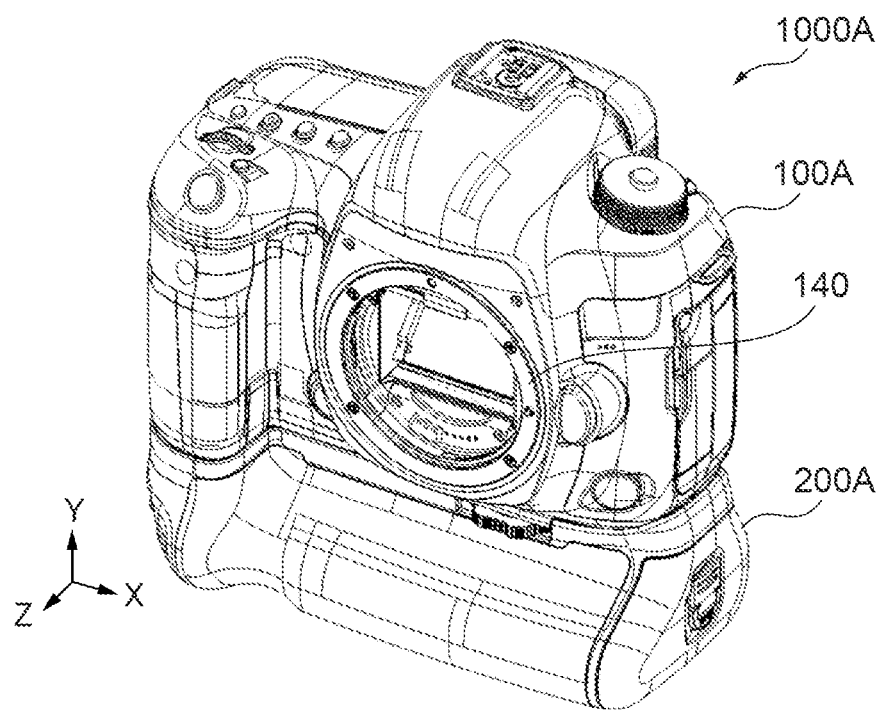
FIGS. 6A and 6B are perspective views showing the appearances of an image capture system according to a second embodiment.
Figure 6B:
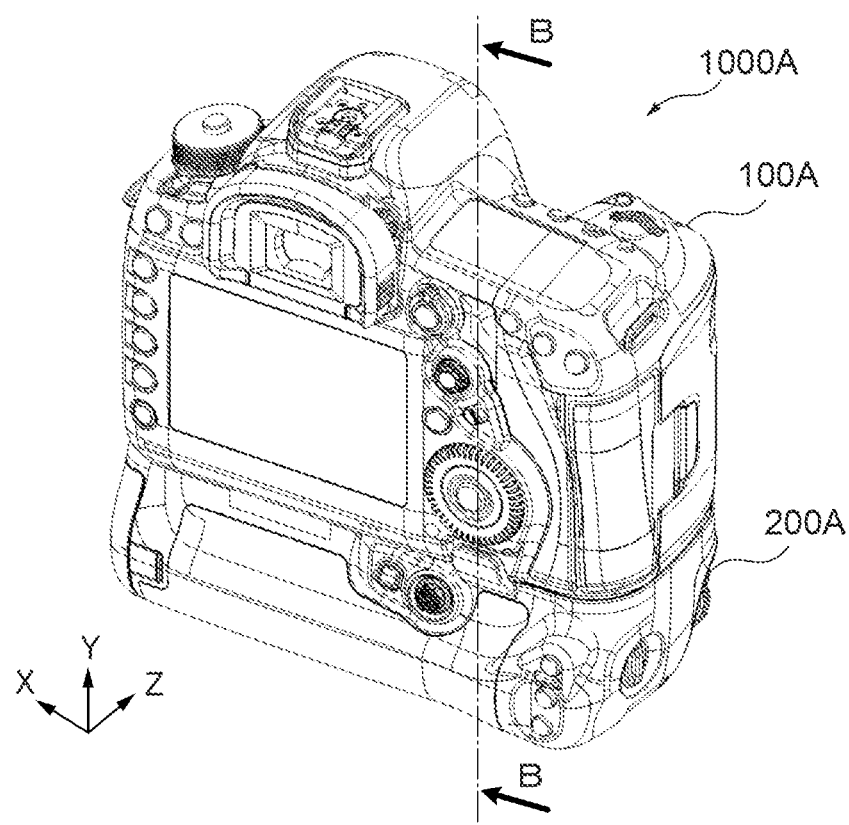

Next, an image capture system according to a second embodiment of the present invention will be described. FIG. 6A is a perspective view of the appearance of the image capture system 1000A according to the second embodiment as viewed from the front. FIG. 6B is a perspective view of the appearance of the image capture system 1000A as viewed from the rear. The image capture system 1000A includes an image capture apparatus 100A and an external connection apparatus 200A. Out of components of the image capture apparatus 100A, components having the same functions as those of the image capture apparatus 100 described in the first embodiment are denoted by the same reference numerals. Further, out of components of the external connection apparatus 200A, components having the same functions as those of the external connection apparatus 200 described in the first embodiment are denoted by the same reference numerals. Hereinafter, a description will be given of the configuration of the image capture system 1000A, focusing on different points from the image capture system 1000 according to the first embodiment, and description common to the image capture system 1000 is omitted.

Figure 7:
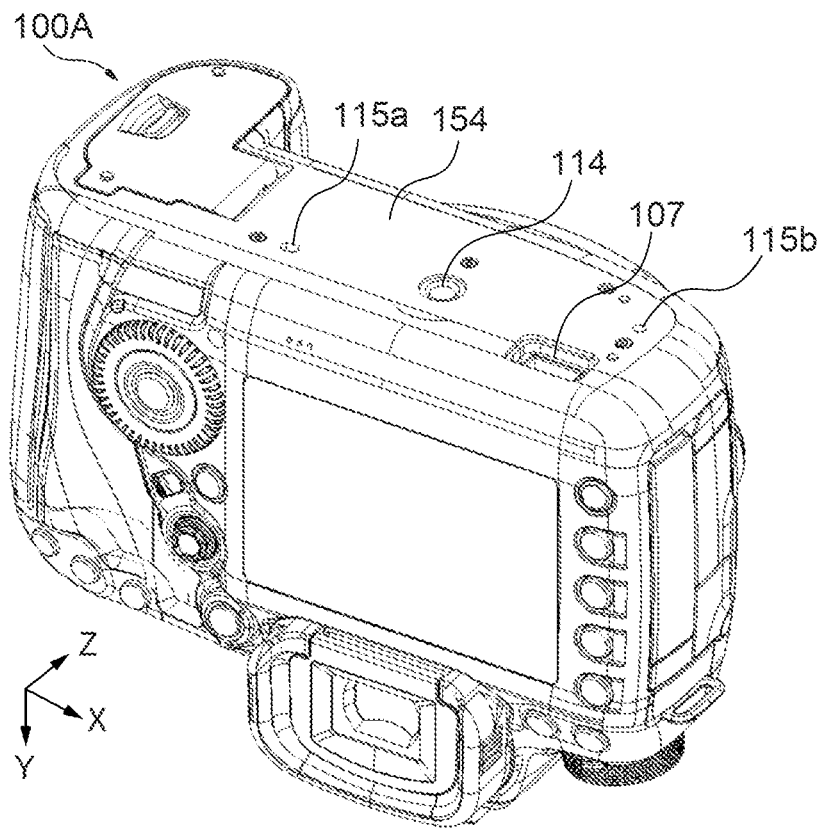
FIG. 7 is a perspective view of an image capture apparatus of the image capture system according to the second embodiment.

FIG. 7 is a perspective view of the appearance of the image capture apparatus 100A as viewed from the bottom. Most of the bottom of the image capture apparatus 100A is covered with a bottom cover 154. The bottom cover 154 is formed with a tripod hole 114 for fixing the external connection apparatus 200A, and positioning holes 115a and 115b for use when attaching the external connection apparatus 200A to the image capture apparatus 100A. Further, the first connection terminal 107 used for electrically connecting the image capture apparatus 100A and the external connection apparatus 200A is exposed from the bottom cover 154 to the outside. Note that the functional blocks of the image capture apparatus 100A correspond to the functional blocks of the image capture apparatus 100 appearing in FIG. 2.

Figure 8:
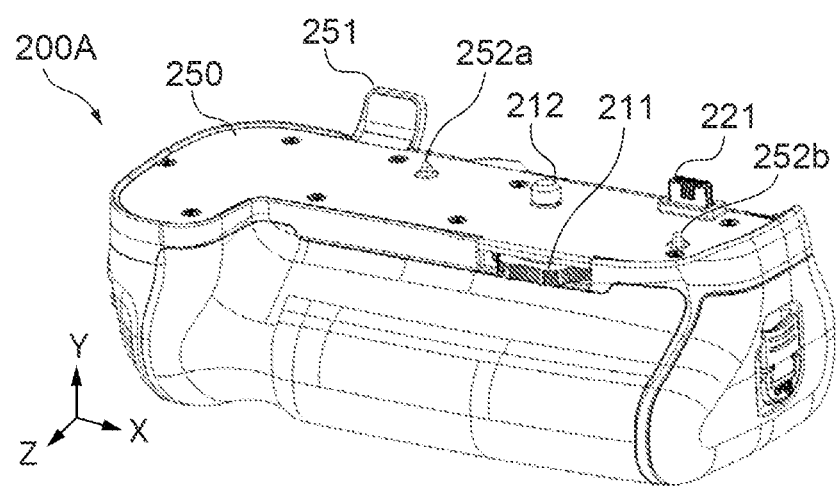
FIG. 8 is a perspective view of an external connection apparatus of the image capture system according to the second embodiment.

FIG. 8 is a perspective view of the appearance of the external connection apparatus 200A. A top surface of the external connection apparatus 200A is covered with a top cover 250. When the external connection apparatus 200A is attached to the image capture apparatus 100A, the bottom cover 154 of the image capture apparatus 100A and the top cover 250 of the external connection apparatus 200A are brought into contact with each other. The top cover 250 is formed with positioning pins 252a and 252b for use when attaching the external connection apparatus 200A to the image capture apparatus 100A. Further, the second connection terminal 221 used for electrically connecting the external connection apparatus 200A and the image capture apparatus 100A protrudes from the top cover 250 in the positive Y direction. When the second connection terminal 221 is connected to the first connection terminal 107 of the image capture apparatus 100A, electrical power can be supplied from the external connection apparatus 200A to the image capture apparatus 100A. Note that the functional blocks of the external connection apparatus 200A correspond to the functional blocks of the external connection apparatus 200 appearing in FIG. 2.

The top cover 250 is formed with a protrusion 251. As shown in FIG. 6B, in the state in which the external connection apparatus 200A is attached to the image capture apparatus 100A, the protrusion 251 is brought into contact with part of the rear of the image capture apparatus 100A. The protrusion 251 has a function of suppressing rotational displacement of the external connection apparatus 200A with respect to the image capture apparatus 100A when a drop impact or the like is applied to the external connection apparatus 200A and the image capture apparatus 100A attached to each other. This makes it possible to prevent the first connection terminal 107 and the second connection terminal 221 from being damaged by too large a load on them.

Figure 9:
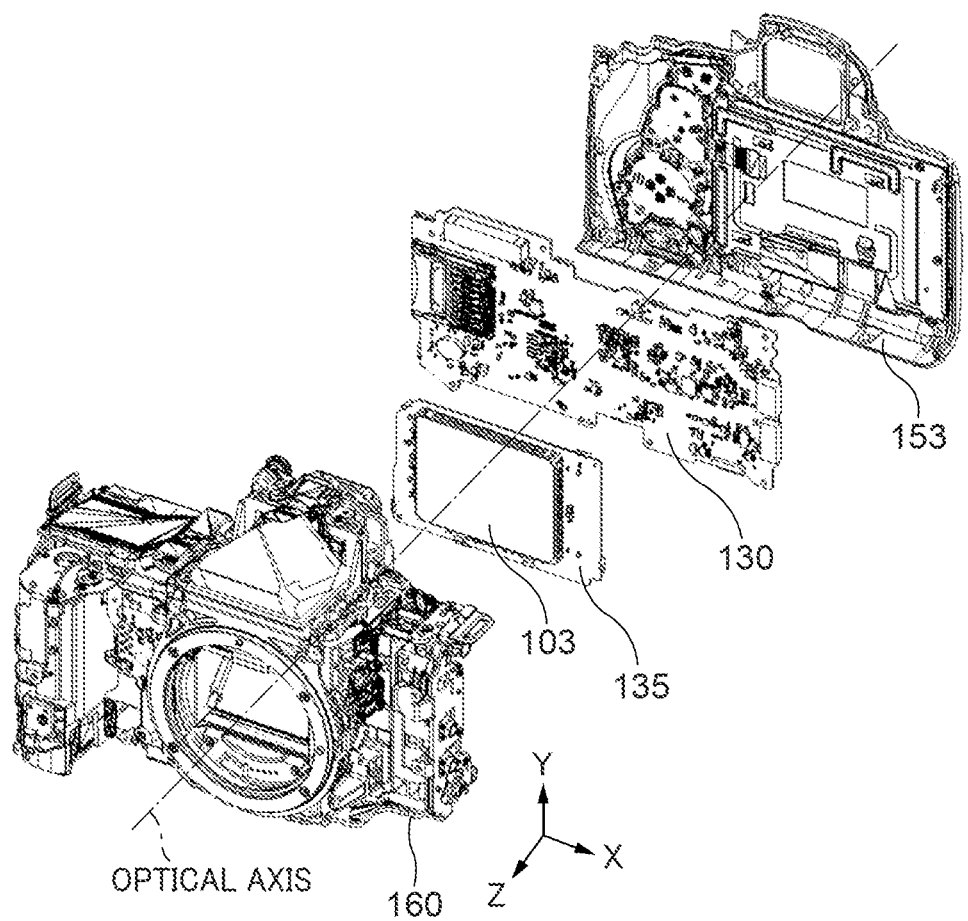
FIG. 9 is an exploded perspective view of the image capture apparatus of the image capture system according to the second embodiment.

FIG. 9 is an exploded perspective view of the image capture apparatus 100A. Note that in FIG. 9, the covers (the top cover 151, the front cover 152, and the bottom cover 154) other than the rear cover 153 are omitted from illustration. The image capturing circuit board 135 having the image sensor 103 mounted thereon, the main circuit board 130, and the rear cover 153, which are arranged in the photographing optical axis direction, as shown in FIG. 9, are fixed to the main base 160 with a plurality of screws (not shown).

Figure 10:
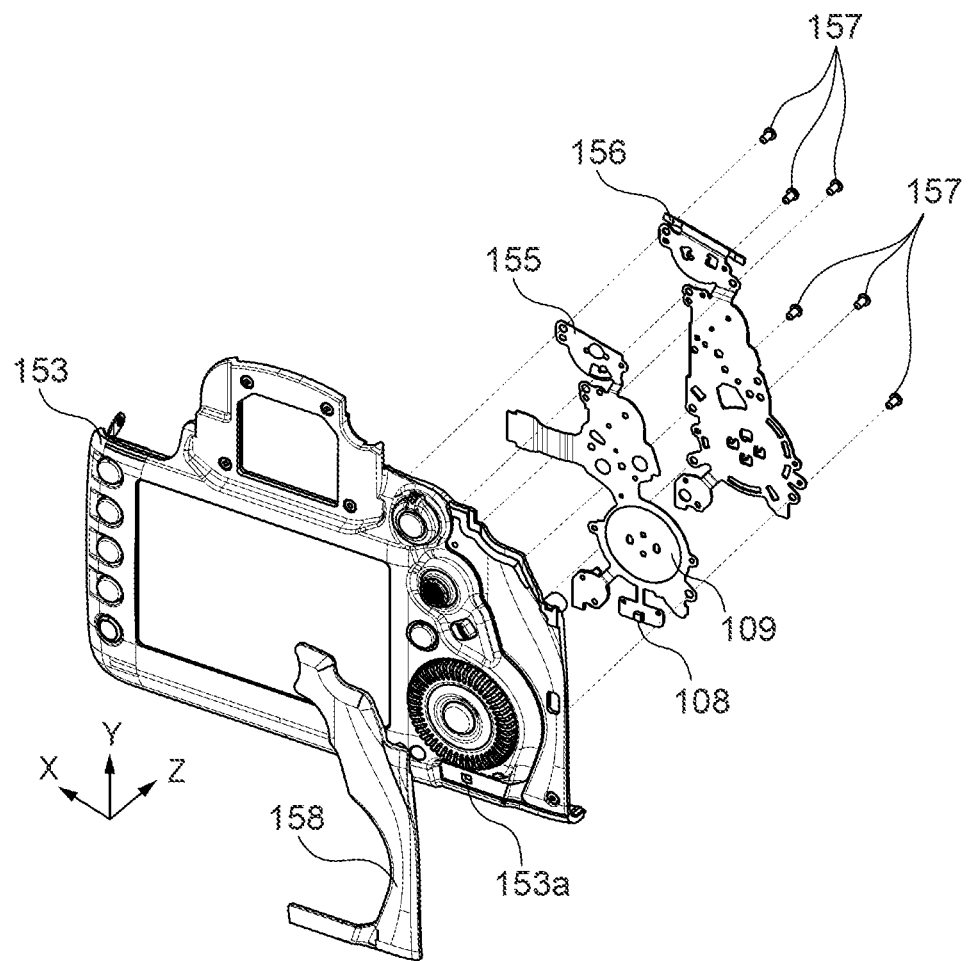
FIG. 10 is an exploded perspective view of the rear of the image capture apparatus of the image capture system according to the second embodiment.

FIG. 10 is an exploded perspective view of the rear of the image capture apparatus 100A. At the rear of the image capture apparatus 100A, there is arranged an FPC 155 (second circuit board) which has the first operation detection section 109 and the first wireless communication section 108 mounted thereon. Thus, the image capture apparatus 100A is configured to dispense with a dedicated circuit board having the first wireless communication section 108 mounted thereon. The FPC 155 is fixed to a metal plate 156 e.g. with a double-sided tape. The metal plate 156 has a function of preventing the FPC 155 from being deformed by a load generated when the first operation member 110 is operated. However, when there is a conductive member around the first wireless communication section 108, the wireless communication performance of the first wireless communication section 108 is lowered, so that the metal plate 156 is designed to have a shape which prevents the metal plate 156 from overlapping the first wireless communication section 108 as viewed from the direction of the photographing optical axis. The metal plate 156 is fixed to the rear cover 153 with screws 157.

The rear cover 153 is sometimes made of a conductive material, as countermeasures against EMI (Electromagnetic Interference) and the like. In this case, to ensure the wireless communication performance of the first wireless communication section 108, an opening 153a is formed at a location of the rear cover 153, opposed to the first wireless communication section 108. The opening 153a is larger than the first wireless communication section 108. That is, the first wireless communication section 108 fits within an area of a shadow projection of the opening 153a as viewed from the direction of the photographing optical axis. A rubber 158 (rubber member) for making it easy for the photographer to hold the image capture apparatus 100A is attached to the outside of the rear cover 153. The rubber 158 covers the opening 153a such that the opening 153a cannot be viewed from the outside. Note that in a case where the rear cover 153 is formed of a dielectric material, such as resin, there is no need to form the opening 153a.

Figure 11A:
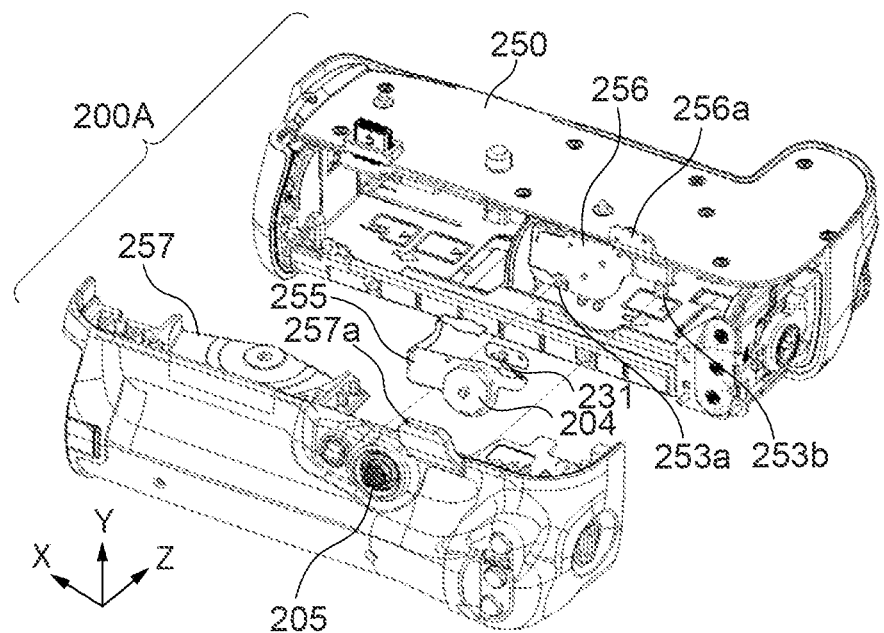
FIGS. 11A and 11B are exploded perspective views of the external connection apparatus of the image capture system according to the second embodiment.

FIG. 11A is an exploded perspective view of the external connection apparatus 200A as viewed from the rear. The external connection apparatus 200A includes an FPC 255 (third circuit board) which has the second operation detection section 204 and the second wireless communication section 231 mounted thereon. Thus, the external connection apparatus 200A is configured to dispense with a dedicated circuit board having the second wireless communication section 231 mounted thereon. The FPC 255 is fixed to a base member 256 which forms the skeleton of the external connection apparatus 200A, e.g. with a double-sided tape. The base member 256 is formed of a non-conductive material, such as a dielectric resin material.

A rear cover 257 that forms the appearance of the rear of the external connection apparatus 200A is fixed to the base member 256 with screws 253a and 253b. The protrusion 251 is formed by a protruding portion 256a of the base member 256 and a protruding portion 257a of the rear cover 257, and the second wireless communication section 231 is contained in the protrusion 251.

Figure 11B:
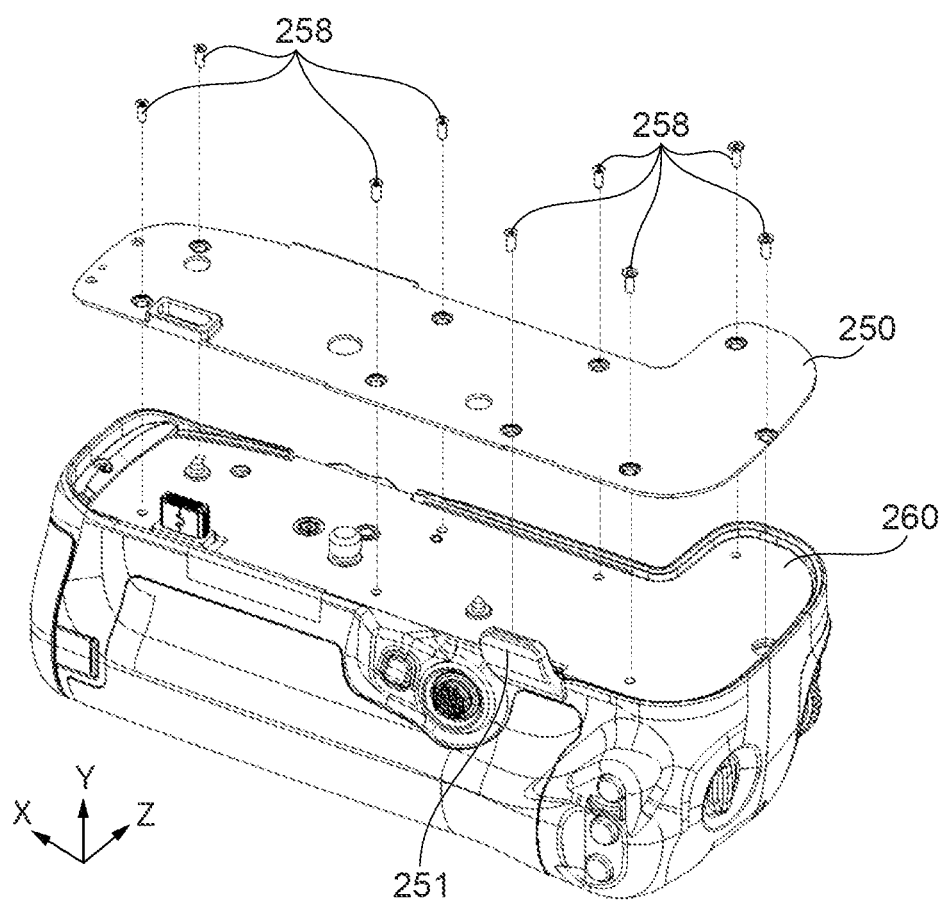

FIG. 11B is an exploded perspective view of a top portion of the external connection apparatus 200A. A metal plate 260 is disposed below the top cover 250 (on a side thereof toward the negative Y direction). The metal plate 260 has a function of increasing the rigidity of the external connection apparatus 200 held by the photographer, and a function of transmitting heat generated within the image capture apparatus 100A during an image capturing operation to the top cover 250 to thereby dissipate the heat to the outside.

The top cover 250 is fixed to the base member 256 with screws 258. The protrusion 251 protrudes above the top cover 250 toward the image capture apparatus 100A (in the positive Y direction), and the second wireless communication section 231 contained in the protrusion 251 also protrudes above the top cover 250 toward the image capture apparatus 100A (in the positive Y direction). This makes it unnecessary to provide an opening for ensuring the wireless communication performance of the second wireless communication section 231 in the metal plate 260, so that it is possible to maintain the rigidity and heat dissipation performance of the external connection apparatus 200A while ensuring the wireless communication performance.

Figure 12:
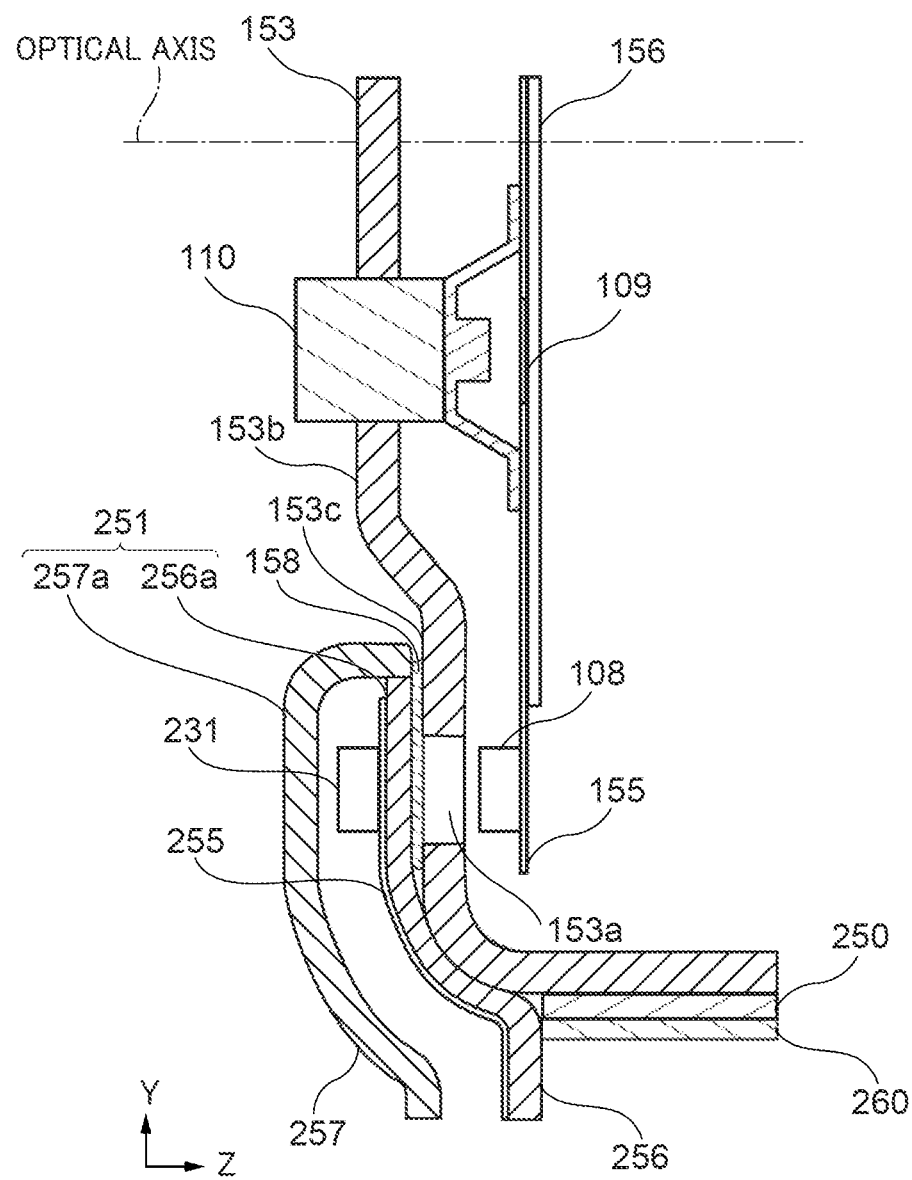
FIG. 12 is a partial cross-sectional view taken along B-B in FIG. 6B.

FIG. 12 is a partial cross-sectional view taken along B-B in FIG. 6B. The protrusion 251 is larger than the opening 153a of the rear cover 153 of the image capture apparatus 100A, and the opening 153a fits within an area of a shadow projection of the protrusion 251 as viewed from the direction of the photographing optical axis. The rear cover 153 of the image capture apparatus 100A includes a second surface 153c dented toward the inside of the image capture apparatus 100A (in the positive Z direction) with respect to a first surface 153b where the first operation member 110 is disposed. The second surface 153c is substantially parallel to the image plane of the image sensor 103 (not shown) (i.e. the second surface 153c is orthogonal to the photographing optical axis). The first wireless communication section 108 is disposed at a location opposed to the second surface 153c in the Z direction.

On the other hand, the protrusion 251 of the external connection apparatus 200A is disposed at a location opposed to the second surface 153c in the Z direction, and the second wireless communication section 231 is disposed at a location opposed to the first wireless communication section 108 in the Z direction. That is, in the second embodiment as well, similar to the first embodiment, the first wireless communication section 108 and the second wireless communication section 231 are opposed to each other in a direction orthogonal to a direction in which the external connection apparatus 200A is attached to the image capture apparatus 100A.

Thus, it is possible to reduce the distance between the first wireless communication section 108 and the second wireless communication section 231, whereby it is possible to obtain high wireless communication performance. Further, by forming the second surface 153c on the rear cover 153, it is possible to reduce the amount of protrusion of the protrusion 251 from the first surface 153b in the Z direction (direction of the thickness of the protrusion 251). Further, the first wireless communication section 108 is disposed at a location of the image capture apparatus 100A toward the bottom cover 154 (in the negative Y direction which is a direction toward an attachment surface of the external connection apparatus 200A where it is attached to the image capture apparatus 100A). With this, it is possible to reduce the height of the protrusion 251 protruding from the top cover 250 toward the image capture apparatus 100A (in the positive Y direction). Thus, it is possible to form the protrusion 251 into a compact shape, whereby it is possible to prevent an increase in the size of the whole the image capture system 1000A, and further it is possible to prevent the protrusion 251 from becoming an obstacle during operation of the image capture system 1000A.

Although the present invention has been described based on the preferred embodiments, the present invention is not limited to the above-described embodiments, but it can be practiced in various forms, without departing from the spirit and scope thereof. Further, the above-described embodiments merely show one embodiment of the present invention, it is also possible to combine the above-described embodiments as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-072094, filed Apr. 4, 2019, which is hereby incorporated by reference herein in its entirety.

What is claimed is:

1. An external connection apparatus that is removably attachable to an image capture apparatus that includes a first wireless communicator, the external connection apparatus comprising:
   a second wireless communicator that performs wireless communication with the first wireless communicator;
   a top cover that is brought into contact with a bottom cover of the image capture apparatus in a state in which the external connection apparatus is attached to the image capture apparatus; and
   a protrusion that is formed of resin and protrudes in a direction of attaching the external connection apparatus to the image capture apparatus with respect to the top cover,
   wherein the second wireless communicator is contained in the protrusion,
   wherein the first wireless communicator is disposed at a location of the image capture apparatus toward an attachment surface of the image capture apparatus to which the external connection apparatus is attachable, with respect to a photographing optical axis of the image capture apparatus, and
   wherein in the state in which the external connection apparatus is attached to the image capture apparatus, the second wireless communicator is located opposite to the first wireless communicator in a direction orthogonal to the direction of attaching the external connection apparatus to the image capture apparatus, with a resin wall portion of the image capture apparatus being located between the first wireless communicator and the second wireless communicator.

2. An external connection apparatus that is removably attachable to an image capture apparatus, the external connection apparatus comprising;
   a top cover that is brought into contact with a bottom cover of the image capture apparatus in a state in which the external connection apparatus is attached to the image capture apparatus;
   a protrusion that is formed of resin, that protrudes in a direction of attaching the external connection apparatus to the image capture apparatus with respect to the top cover, and that is disposed outside an outer surface of the image capture apparatus in the state in which the external connection apparatus is attached to the image capture apparatus; and
   a wireless communicator contained in the protrusion.

* * * * *